United States Patent [19]
Haigh

[11] Patent Number: 5,577,339
[45] Date of Patent: Nov. 26, 1996

[54] FISHING TACKLE

[75] Inventor: Leonard Haigh, Evesham, United Kingdom

[73] Assignee: Entaco Limited, Studley, United Kingdom

[21] Appl. No.: 340,111

[22] Filed: Nov. 15, 1994

[30] Foreign Application Priority Data

Nov. 17, 1993 [GB] United Kingdom ............. 9323697

[51] Int. Cl.⁶ .................... A01K 91/00; A01K 91/18
[52] U.S. Cl. ............... 43/42.74; 43/44.84; 43/44.83; 24/666; 24/701
[58] Field of Search ............. 43/42.74, 44.83, 43/44.84, 44.85, 42.49, 43.1, 43.15; 24/666, 701

[56] References Cited

U.S. PATENT DOCUMENTS

| | | | |
|---|---|---|---|
| 1,037,991 | 9/1912 | Robinson | 24/701 |
| 1,078,434 | 11/1913 | Haga | 24/701 |
| 3,161,930 | 12/1964 | Crosson | 24/701 |
| 4,194,273 | 3/1980 | Williams | 24/701 |
| 4,271,999 | 6/1981 | Stravitz | 24/666 |
| 4,633,609 | 1/1987 | Brown | 43/43.1 |
| 5,005,269 | 4/1991 | Hirsch | 24/666 |
| 5,129,177 | 7/1992 | Haigh | 43/44.83 |
| 5,251,396 | 10/1993 | Haigh | 43/44.84 |
| 5,301,454 | 4/1994 | Chen | 43/44.83 |

*Primary Examiner*—Kurt Rowan
*Attorney, Agent, or Firm*—Armstrong, Westerman, Hattori, McLeland & Naughton

[57] ABSTRACT

A fishing tackle comprising an elongate snood having an elongate small diameter body part and at one end of the body part and integral therewith, an attachment means comprising a passageway in which is retained a part of a member whereby the member is attached to the snood, said body part comprising a drawn synthetic plastics material and wherein a first portion of the attachment means, in which is provided a part of said passageway in which said part of the member is retained, comprises a pre-formed, undrawn, synthetic plastics material portion and a second portion of the attachment means, in which is provided a part of said passageway through which said part of the member may pass to permit assembly of said part of the member with said attachment means, comprises a drawn synthetic plastics material.

19 Claims, 4 Drawing Sheets

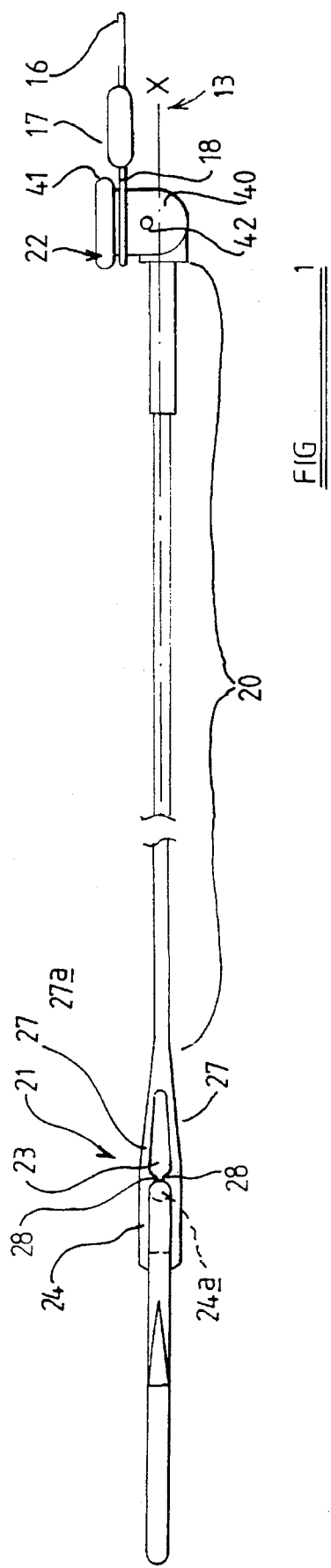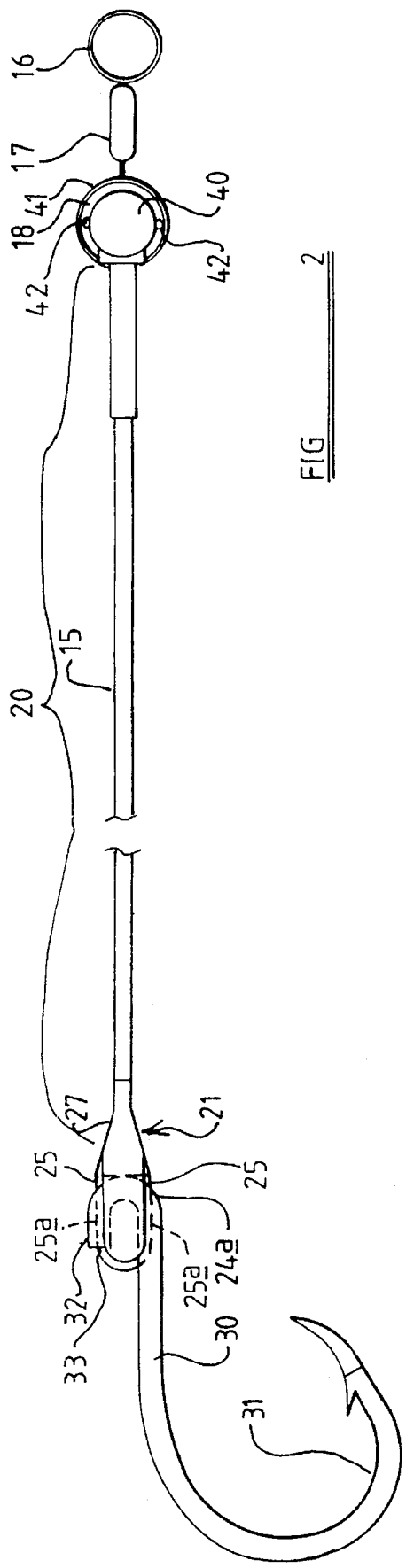
FIG 1
FIG 2

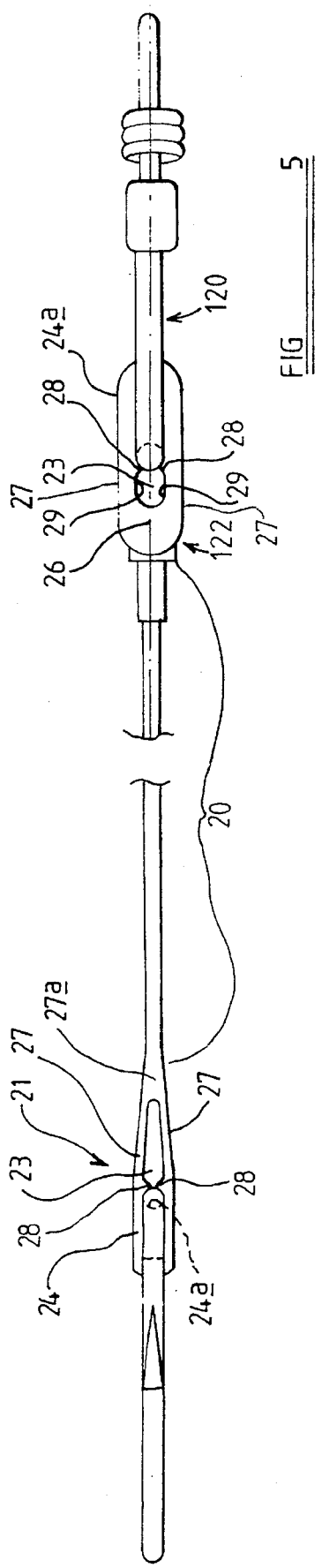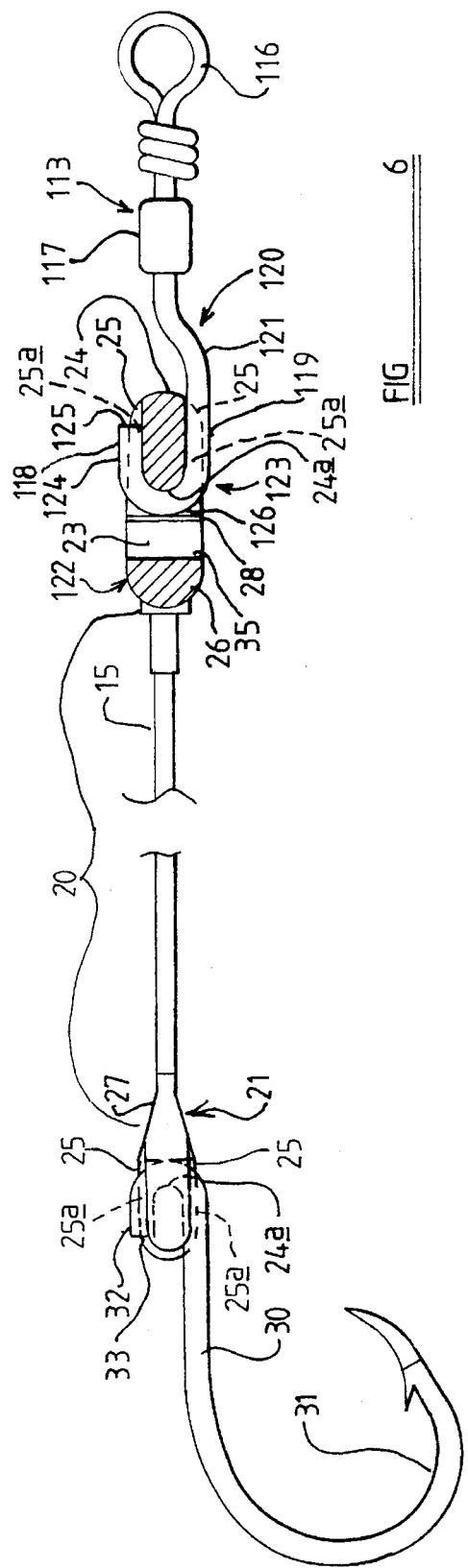

FISHING TACKLE

BACKGROUND TO THE INVENTION

This invention relates to a fishing tackle comprising a snood having a first attachment means whereby a member, such as a fishing hook or a fishing line, is attached to the snood.

The fishing line may be of the "long line" type having a plurality of hooks connected at spaced positions along the length of the line by a plurality of snoods. The length of such "long lines" varies from several meters up to two or three kilometres or even longer with snoods at typically a half to one meter intervals along at least a substantial part of the line length.

GB-A-2214043, and corresponding U.S. Pat. No. 5,129, 177, discloses a fishing tackle, hereinafter referred to as being of the kind specified, comprising an elongate snood having an elongate small diameter body part and at one end of the body part and integral therewith, an attachment :means comprising a passageway in which is retained a part of a member whereby the member is attached to the snood, said body part comprising a drawn synthetic plastics material and said attachment means comprising a pre-formed, undrawn, synthetic plastics material portion and having said passageway therein.

In GB-A-2214043 both a part of the passageway in which is retained said part of the member and a part of the passageway through which the part of the member may pass to permit assembly of said part of the member with said attachment means are provided in a part of the attachment member which is pre-formed and undrawn. Consequently, the attachment means suffers from the disadvantage that it is relatively large. However, it is desirable to minimise the risk of detection of the fishing tackle by fishes by minimising the size of the attachment means.

SUMMARY OF THE INVENTION

Accordingly, an object of the present invention is to provide a new and improved fishing tackle of the kind specified wherein the above mentioned disadvantage is overcome or is reduced.

According to one aspect of the present invention we provide a fishing tackle of the kind specified wherein a first portion of the attachment means, in which is provided a part of said passageway in which said part of the member is retained, comprises a pre-formed, undrawn, synthetic plastics material portion and a second portion of the attachment means, in which is provided a part of said passageway through which said part of the member may pass to permit assembly of said part of the member with said attachment means, comprises a drawn synthetic plastics material.

Said passageway may terminate in and extend between open mouths disposed at opposite ends of the passageway so as to be spaced apart transversely to a longitudinal axis of the body part, and said member may have a body part having a functional part and a transversely extending part having a free end projecting rigidly from said body part of the member into said passageway of said attachment means and abutting a transverse abutment part providing a wall of the passageway and said member having a retaining means at the free end of the transversely extending part to retain said transversely extending part in the passageway.

The drawn portion may comprise at least a majority of the longitudinal extent of two opposed side walls of the passageway, whilst the pre-formed, undrawn portion provides a transverse abutment part which provides an end wall of the passageway at the end of the passageway distant from the body part of the snood.

The side walls of the passageway may be formed so as releasably to retain the transverse abutment part adjacent said end wall of the passageway.

The side walls may be formed with a projection such as a rib upstanding from at least one side wall and adapted to engage a part of the member facing away from the end wall.

The projections may be provided in the undrawn portion of the attachment means.

The passageway may have an extent in the longitudinal direction of the body part of the snood which permits entry of the transversely extending part of the member with minimum clearance.

The distance between the end wall of the passageway with which the member abuts and the effective opposite end of the passageway may be substantially the same as the length of the retaining part.

The snood may comprise a monofilament synthetic plastics material or a multifilament synthetic plastics material.

The synthetic plastics material may comprise nylon.

The majority of the body part of the snood, except for the attachment means, may be of a maximum cross-sectional dimension of less than 2.5 mm and preferably less than 2.00 mm.

The element may have a tensile strength of more than 50,000 lbs. per square inch (345,000 kPa) and a tensile elongation of less than 15%.

The member may comprise a body part having an operative part and a retaining part spaced transversely from the body part and connected thereto by said transversely extending part of the member.

The retaining part may be adapted to be passed through said passage so that the transverse abutment part of the attachment means is embraced by the body part, retaining part and transversely extending part of the member.

The transverse abutment part may be provided with a pair of grooves in oppositely transversely facing side walls thereof to receive part of the body part and retaining part therein and thus restrain the member from pivotal movement about a transverse axis relative to the attachment means.

In a first more specific aspect of the invention, the snood, at the other end of the body part, may be provided with a second attachment means similar to said attachment means.

In a second more specific aspect of the invention the snood may be provided with a second attachment means which comprises a wholly pre-formed, undrawn, synthetic plastics material enlarged portion having a passageway therein, said passageway terminating in and extending between open mouths disposed at opposite ends of the passageway so as to be spaced apart transversely to a longitudinal axis of the body part and a member for engagement with the second attachment means having a body part with a transversely extending part having a free end, projecting rigidly from said body part of the member into said passageway of said enlarged portion of said second attachment means through one of said open mouths and abutting a transverse abutment part provided by a wall of the passageway and said member having a retaining means at the free end of the transversely extending part to retain said transversely extending part in the passageway.

In a third more specific aspect of the invention the snood may be provided with a second attachment means which comprises a transversely extending portion at the other end of the snood to the first attachment means, the transversely extending portion having a free end adapted to be received within an opening of a further member such as an eye of a conventional fishing swivel comprising a pair of eyes connected together in rotatable inter-engagement.

The transversely extending portion of the second attachment means may have a further retaining means which projects transversely relative to the longitudinal extent of the transversely extending portion and is adapted to engage the further member to retain the further member in engagement with the transversely extending portion.

The member may be a hook and the hook may be engaged with the or the second attachment means and the body part of the hook comprising a shank having, at one end, said functional part, which comprises a hook shaped tine, and having, at the other end, said transversely extending part and said retaining part.

The shank may extend longitudinally beyond the tip of the tine by less than the longitudinal extent of the tine.

Preferably the shank extends longitudinally beyond the tip of the tine by a distance approximating to twice the longitudinal extent of the retaining part of the hook.

Adjacent said other end of the shank the hook may be of generally U-shape, one limb of the U being integral with the shank of the hook, and the other limb of the U providing said retaining part and being of shorter length than the shank of the hook, terminating at a free end and the base part of the U comprising said transversely extending part of the hook.

The attachment means may be a configuration such that no cross-sectional dimension greatly exceeds the diameter of the hook shank to be attached thereto.

Alternatively the member may be a swivel, and the swivel may be engaged with said attachment means or with the second attachment means, the body part of the swivel comprising a shank having, at one end, said functional part, which comprises a swivel connector to connect the body part rotatably to a further component, and has, at the other end, said transversely extending part and said retaining part.

The fishing tackle may comprise a fishing line, a swivel attached thereto and the snood is connected to the swivel and a fishing hook attached to the snood.

The fishing line may have a plurality of swivels attached thereto at spaced intervals thereon and a snood being connected to said swivels and a fishing hook being connected to each snood.

The swivels may be attached to the fishing lines by leaders.

The fishing line may be adapted to be suspended below the water surface by a plurality of buoys.

The fishing line may be a "long line".

According to another aspect of the present invention we provide a method of making a fishing tackle according to the first aspect of the invention comprising the steps of providing a pre-form snood having a pre-form attachment means at one end of a pre-form body part, heating said pre-form body part and a part of said pre-form attachment means, applying a tension force to the pre-form body part and the pre-form attachment means to stretch the body part and a portion only of the pre-form attachment means to form said drawn body part and said second, drawn, portion of the attachment means.

The pre-form attachment means may have an aperture therein in which a locating element is received and the pre-form snood may be engaged with a second element at or adjacent the other end of the pre-form body part and the method may include the step of causing relative movement between the locating element and the second element to stretch the portion of the pre-form therebetween.

BRIEF DESCRIPTION OF THE DRAWINGS

Embodiments of the invention will now be described by way of example with reference to the accompanying drawings, wherein:

FIG. 1 is a front elevation of a snood embodying the invention,

FIG. 2 is an underneath plan view of the snood of FIG. 1,

FIG. 5 is a fragmentary front elevation of another modification of the snood of FIG. 1, FIG. 6 is a fragmentary underneath plan view of the modification shown in FIG. 5.

DESCRIPTION OF THE PREFERRED EMBODIMENTS

Figure 7:
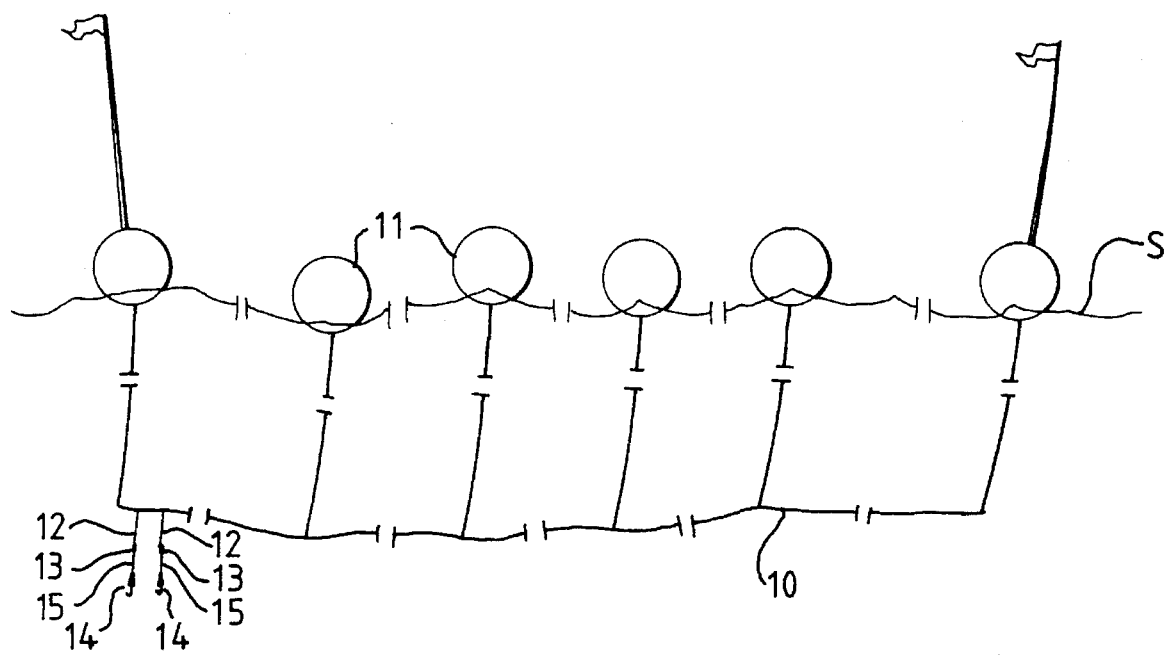
FIG. 7 is a diagrammatic illustration of a long line having a plurality of snoods attached thereto.

Referring now to FIG. 7, there is shown a long line 10 supported at a desired level below the surface 5 of the sea by fishing floats 11. The long line 10 may be of any desired length but is typically up to two or three kilometres in length, although it may be shorter or longer than this. At spaced positions along the length of the long line 10, for example at one meter or half meter intervals, are provided leaders 12 connected to the long line 10 in conventional manner. Each leader 12 is connected, in conventional manner to a member comprising a swivel 13 to which a member comprising a hook 14 is connected by a snood 15.

Referring now to FIGS. 1 and 2, each swivel 13 comprises a first eye 16 connected in conventional manner, for example by tying, to the leader 12. The eye 16 is connected by a rotatable joint 17 to a second eye 18 which is releasably connected to the snood 15.

The snood 15 comprises an elongate circular in cross-section body part 20 having a hook attachment means 21 at its "bottom" end and a line attachment means 22 at its "top" end and comprises a one-piece unitary structure made by moulding a pre-form in an injection moulding apparatus and then heating and stretching the pre-form as hereinafter to be described.

Figure 8:
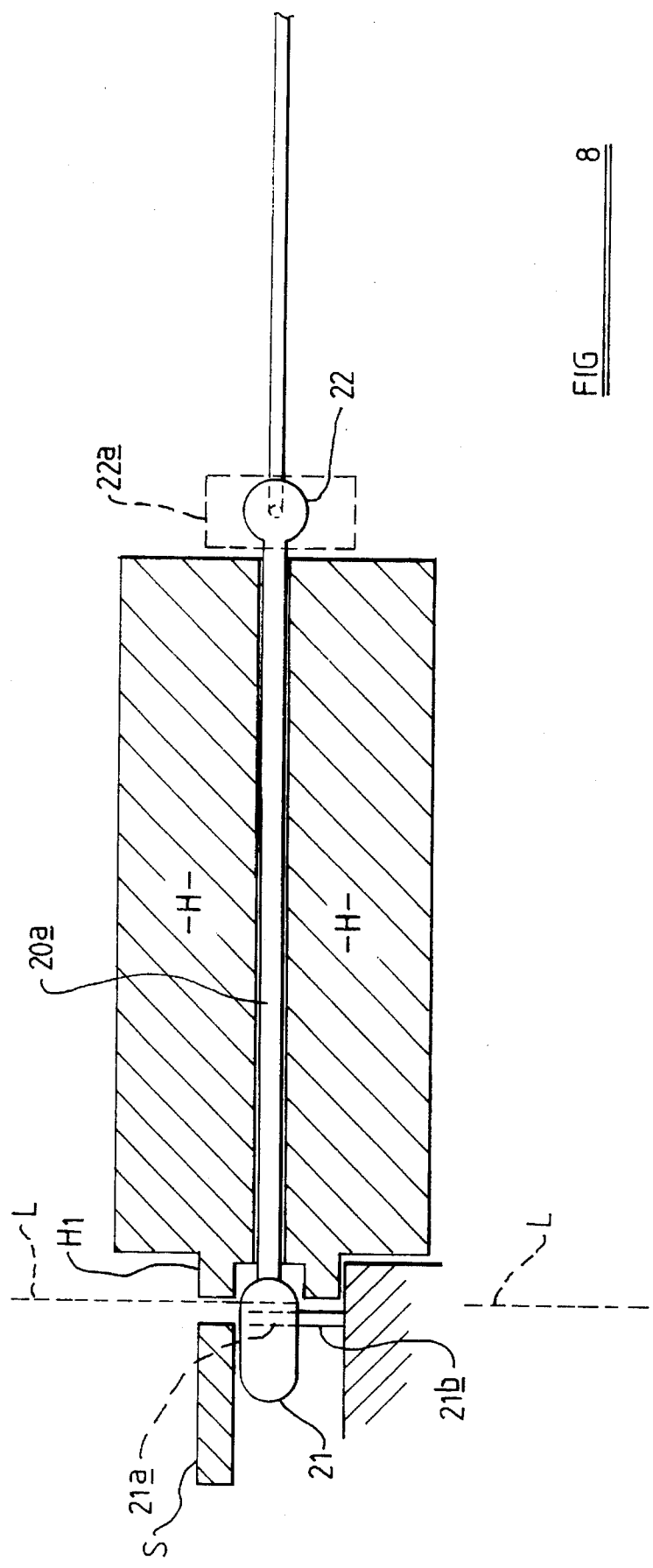
FIG. 8 is a side elevation of part of an apparatus for use in making a snood embodying the invention and illustrating a step in the method of making a snood embodying the invention.

In the pre-form the attachment means 22 is moulded to its final form whilst the attachment means 21 is moulded to a configuration illustrated diagrammatically in FIG. 8 so as to be provided with an opening 21a. A locating element such as a pin 21b is inserted in the opening 21a whilst the other attachment means 22 is gripped in a suitable gripping means 22a which is movable, by means, not shown, away from the pin 21b.

The body part 20a is heated by a suitable means such as by being closely spaced from heating blocks H but the pin 21b and the gripper 22a are unheated. In the illustrated example the part of the attachment means 21 to the left of line L is insulated by the illustrated air gap from heating by the heating means H to a temperature at which stretching, or at least any significant stretching, takes place. The heating blocks are configured as shown at $H_1$ so as to be closely adjacent the part of the pre-form to the right of the line L and so this part of the pre-form and the body part 20a are heated to, for example, a temperature lying in the range 130° to 220° C. where, as in the present example, the material of the snood is nylon, and then the gripper 22a is moved, to the right in FIG. 8, over a period of time lying in the range 25–30 seconds. The pre-form is elongated such that the ratio of the maximum cross-sectional dimension (normally the diameter, since the body part would normally be of cylindrical configuration) of the elongate body part 20 before and after stretching lies in the range 2:1–5:1 and the length of the snood increased in the corresponding ratio. In addition the portion of the pre-form attachment means 21 to the right of the line L is also stretched to have the configuration shown in FIGS. 1 & 2, whilst the portion of the pre-form attachment means 21 to the left of the line L remains unstretched. Of course, there is a region adjacent the line L where the temperature of the pre-form falls from a temperature at which stretching takes place to a temperature at which no stretching takes place, and in this transitional region there is a temperature gradient and a corresponding amount of stretching takes place.

If desired suitable shield means as shown at S may be provided to shield the portion of the attachment means 21 to the left of the line L and/or to shield the whole or of the attachment means 22 from heating to a temperature at which stretching can occur. If the second attachment means is of a different configuration to that shown in FIGS. 1 and 2, for example of one of the configurations described hereinafter and shown in the other Figures, the engagement therewith with the stretching means is adapted appropriately. For example, if the second attachment means is of the same configuration as the first attachment means described hereinbefore, a second element for causing stretching of the pre-form may comprise a pin similar to the pin 21b instead of the gripper 22a described herebefore and the spacing of the attachment means from the heater blocks H may be arranged so as to prevent any, or permit partial, stretching of the other attachment means as desired.

Moreover, in all cases either the stretching means are engaged with the first attachment means and/or the stretching means are engaged with the further attachment means, may be moved relative to a fixed part of the apparatus. The snood in its final form has a diameter to length ratio lying, for example, in the range 1:600–1:1250.

With presently available moulding techniques it is not practicable to make a finished snood having a diameter to length radio of, for example, at least 1:600 and hence it is not possible to mould a snood with integrally moulded attachment means and a body part of the required small diameter. In addition, a moulded snood, however thin, would generally have insufficient tensile strength and too much elongation. However, by moulding the attachment means integrally with an elongate part in an intermediate product, where the elongate part has a diameter to length ratio which can be moulded, and subsequently stretching the elongate part to the final desired diameter to length ratio and stretching a portion of the pre-moulded attachment means, a snood is provided in accordance with the present invention which has desired tensile strength and limited elongation. In addition the stretched part of the attachment means reduces the overall size of the attachment means and hence minimises the risk of detection by fishes whilst the stretching increases the inherent strength of the material so that despite the smaller cross-section of the stretched portion its strength is maintained at an adequate level.

Although in this example the snood comprises a monofilament of nylon, it may be made from monofilament of other suitable material (such as polyethelene or polyester). Alternatively, the snood may be made from multifilament material by moulding attachment means on the multifilament and then performing a stretching operation such as described hereinbefore.

In one example of a snood embodying the present invention an intermediate part was made in RILSAN II nylon by a conventional injection moulding technique. The elongate body part of the intermediate product was approximately 100 mm long and 3 mm diameter over the majority of its length but has parts of 3.75 mm diameter adjacent the ends.

The elongate part was heated to a temperature of 150° C. and the blank and the above described portion of the attachment means 21 was stretched for a period of 20 seconds and the elongate part was stretched to increase the length thereof 4.25× its original length, i.e. to approximately 425 mm. There was a corresponding reduction in the diameter of the elongate part of the intermediate part so that the diameter of the intermediate part was approximately two times larger than the final diameter of the elongate body part of the snood, which was 1.5 mm diameter so far as the smallest diameter portion was concerned whilst the largest diameter of the end portion and the unshielded portion of the attachment means 21 was correspondingly reduced.

After stretching, the hook attachment means 21 comprises a generally stirrup shaped part comprising a transversely extending passageway 23 bounded at its bottom end by a transverse abutment part 24 having an abutment surface 24a and transversely facing side surfaces 25 in which grooves 25a are provided.

The transverse abutment part is thus pre-formed and extends transversely to a longitudinal axis X-X of the body part 20 over a transverse extent which is greater than the diameter of the body part.

The part of the passageway 23 between the abutment surface 24a and the body parts 20 comprises over substantially the whole of its length a stretched portion comprising relatively thin side wall members 27 which merge progressively with the body part 20, as shown at 27a. As can be seen in FIG. 2, each side wall member 27a is of thin and tapering configuration and thus the risk of detection of the snood by fishes is minimised.

Inwardly projecting ribs 28 are provided on the inwardly facing surfaces 29 of the side walls 27.

The hook 14 comprises a body part or shank 30 having an operative part comprising a conventional barbed hook shape 31 at its bottom end and a generally U-shaped configuration at its top end, the longer limb of the U being integral with the remainder of the shank 30 of the hook whilst the shorter limb 32 of the U terminates at a free end 33, is connected to the longer limb 30 by a transversely extending part 34, and provides a retaining means which is spaced transversely from the shank. The transversely extending part 34 projects rigidly transversely from the shank 30 on the opposite side thereof to the hook shape 31. The shank and U-shaped parts of the hook are of circular cross-section. The shank 30 extends longitudinally beyond the tip of the tine by less than the longitudinal extent of the tine and, in the present example, the shank extends longitudinally beyond the tip of the tine by a distance approximating to twice the longitudinal extent of the retaining part of the hook and hence the hook is relatively short and inconspicuous to fish.

The stretched portion of the attachment means is dimensioned so as to enable the shorter limb 32 of the U to be manipulated through the passage by arranging that the spacing between the walls 27 is adequately great, bearing in mind the inherent resilience of the material at a distance from the surface 24a which approximates to the length of the shorter limb 32.

In use, the shorter limb 32 of the hook is fed transversely through the passageway 23 until the shank 30 engages one of the grooves 25a whereupon the hook is moved longitudinally in the direction of the axis X-X to move the base of the U past the opposed ribs 28 so that the ribs abut against the curved surface of the base of the U and serve to retain the hook with the abutment surface 24a in engagement with the inner surface of the part 34 of the hook. The shorter limb 32 is received within the other groove 25a and hence the transverse abutment part 24 is embraced by the shank 30, transversely extending part 34 and retaining means 32 of the hook. The hook 14 is therefore retained releasably in attachment with the snood by the attachment means 21 by virtue of releasable mechanical inter-engagement therewith. If it is desired to replace the hook, it is simply necessary to manipulate the hook initially axially parallel to the axis X-X to move the part 34 past the ribs 28 and then to withdraw the retaining means 32 transversely from the passageway 23.

The line attachment means 22 comprises a transversely extending portion 40 of cylindrical configuration and projecting from one side of the central axis X-X. At its free end the transversely extending portion 40 has an outwardly extending flange 41 of a diameter such that it cannot pass through the eye 18 of the swivel 13. The transversely extending portion 40 is provided with a pair of diametrically opposed secondary retaining pips 42 of a length so that they can be just passed through the eye 18 but serve to retain the eye 18 between the pips 42 and the flange 41 unless considerable force is applied to the eye 18 to move it part the pips 42.

In order to assemble the snood to the swivel, the bottom end of the snood, i.e. the hook attachment means 21, is first passed through the eye 18, then the body part of the snood, followed by manipulation of the transversely extending portion 40 and the pips 42 thereof through the eye 18 with the aid of a tool for convenience in passing the pips 42. When it is desired to remove the snood from the swivel, the pips 42 are forced through the eye 18 in the reverse direction, again with the aid of a suitable tool and the reverse sequence of operations is then performed. If desired, it is possible both to connect the snood and disconnect the snood from the swivel with the hook 14 connected to the snood by manipulating the hook 14 through the eye 18.

Figure 3:
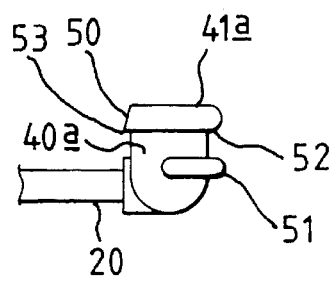
FIG. 3 is a fragmentary front elevation of a modification of the snood of FIG. 1.
Figure 4:
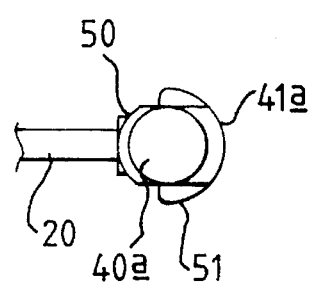
FIG. 4 is a fragmentary underneath plan view of the modification shown in FIG. 3.

In a modification, shown in FIGS. 3 and 4, the flange 41 extends through only a limited circumferential extent, as shown at 41a in FIG. 4, and the diametrically opposite portion is chamfered as shown at 50. Consequently, the transversely extending portion 40a shown in FIGS. 3 and 4 can be inserted into the eye 18 by first manipulating the flange part 41a through the eye and then forcing the diametrically opposite part 50 therethrough, preferably with the aid of a special tool. The shoulders 52, 53 provided by the flange 41a and part 50 respectively, serve to prevent withdrawal of the transversely extending portion 40a from the eye 18, whilst a semi-circular flange 51, together with the adjacent part of the snood body 20 prevents passage of the transversely extending portion 40a through the eye 18 in the opposite direction, so that the eye 18 is trapped between the flange 41a and the snood body 20 on the one side and the flange parts 52, 53 on the other side.

When it is desired to remove the snood from the swivel, this can be done by performing the above described operation in reverse, preferably with the aid of a tool to force the shoulder 53 of the chamfered part 50 through the eye 18.

The snood is therefore retained releasably in attachment with the swivel by the line attachment means 22 by virtue of releasable mechanical inter-engagement therewith.

In another modification, shown in FIGS. 5 and 6, a line (second) attachment means of the swivel is shown at 122 and in this modification the attachment means comprising the transverse abutment part 24 and the ribs 28 are as described in connection with the attachment means 21 of FIGS. 1 and 2, but the remainder of the attachment means is, in this embodiment, not stretched and so the attachment means is wholly pre-formed to the configuration shown in FIGS. 5 and 6, hence the description of the attachment means 21 contained hereinbefore is equally applicable mutatis mutandis to the attachment means shown at 122 and the same reference numerals have therefore been used in connection with the attachment means 122 as are used in FIGS. 1 and 2 in connection with the attachment means 21.

In this embodiment a swivel 113 is provided having an operative part comprising a first eye 116 and a rotatable joint 117 as described in connection with the swivel 13 but in this embodiment the second eye 118 is modified so as to be of generally U-shape. That is to say, extending from the rotatable joint 117 is a body 120 comprising a shank 121 having at one end said rotatable joint 117 and at its other end limbs of generally U-shape configuration, the longer limb 119 of the U 123 being integral with the remainder of the shank 121, whilst the shorter limb 124 of the U terminates at a free end 125. The shank 121 is cranked so that the central axis of the U 123 is co-axial with the axis of rotation of the rotatable joint 117. The shorter limb 124 is connected to the longer limb 119 by a transversely extending part 126 and provides a retaining means which is spaced transversely from the shank 121. The shank and U-shaped parts of the swivel are of circular cross-section.

The distance between the abutment surface 24a and an opposed surface 35 of the cross-head 26 approximates to the length of the shorter limb 125 of the U 123.

In use, the shorter limb 124 is fed transversely through the passageway 23 in the same way that the shorter limb 32 of the hook 30 is introduced into the passage 23 of the first attachment means 21.

The swivel 113 is therefore retained releasably in attachment with the snood by the attachment means 122 by virtue of releasable mechanical inter-engagement therewith. If it is desired to replace the snood, it is simply necessary to manipulate the swivel initially axially parallel to the axis X-X to move the part 126 past the ribs 28 and then to withdraw the retaining part 124 transversely from the passageway 23. If desired, however, the attachment means 122 may be of different size to the attachment 21, although of the same general configuration, if it is found convenient to make the attachment means for connection to the hook either larger or smaller than the attachment means for connection to a swivel and of course the corresponding parts of the hook and swivel would be correspondingly dimensioned.

In another modification, not shown, the line (second) attachment means for the swivel is of the same configuration as the hook attachment means 21 provided at the other end of the snood.

In the case of the above described examples, the tensile strength of the snood was measured and was found to be 67218 lbs per sq. inch (463468 kPa). The assembly failed in the elongate part of the snood, well spaced from the attachment means, thereby demonstrating that the attachment means do not comprise the weakest part of the assembly snood as was frequently the previous case when a conventional hitch or other knot comprised the attachment means.

The diameter of the elongate part of the snood pre-form is determined by experiment so as to produce a finished snood of the required strength, flexibility and size to hold a selected load and the strength of the stretched part of the attachment means is determined by controlling the cross-section of the plastics material when designing the pre-form to be injection moulded.

Other forms of heating device may be provided so long as they are capable of heating the elongate part accurately to the desired temperature and again any desired elongating means may be provided so long as it elongates the moulding in the manner described hereinbefore. The diameter and the amount of elongation vary depending upon the desired final diameter and are determined empirically. A snood according to the present invention avoids the disadvantages encountered in practice when a snood is fastened to a fishing line or hook by tying a hitch or other knot since it is found that in such circumstances the strength of the snood is diminished in the region of the hitch or other knot and the snood typically fails at the hitch or other knot.

If desired the hook and attachment parts may be of other configuration to that described above and preferably to provide a releasable mechanical inter-engagement between snood and hook and/or swivel. The transverse abutment part preferably extends over a transverse extent which is not less than the minimum transverse dimension of the body part so as to provide adequate strength. If desired the releasable mechanical inter-engagement may be between an attachment means and a part permanently or releasably connected to the hook and/or between an attachment means and a connecting element attached to the line without the interposition of a swivel.

The present invention permits, in preferred embodiments, of simple easy replacement of hook and/or snood. Although the invention is primarily intended for use in commercial fishing operations with long lines, if desired the invention may be used in any desired application, for example, in recreational fishing where a single hook may be attached to a line using a snood embodying the invention.

If desired any configuration described hereinbefore for a hook (first) attachment means may be used for a line (second) attachment means and vice versa.

The features disclosed in the foregoing description, or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

I claim:

1. A fishing tackle comprising an elongate snood having an elongate small diameter body part and at one end of the body part and integral therewith, an attachment means comprising a passageway in which is retained a part of a member whereby the meter is attached to the snood, said body part comprising a drawn synthetic plastics material and wherein a first portion of the attachment means, in which is provided a part of said passageway in which said part of the meter is retained, comprises a pre-formed, undrawn, synthetic plastics material portion and a second portion of the attachment means, in which is provided a part of said passageway through which said part of the member may pass to permit assembly of said part of the member with said attachment means, comprises a drawn synthetic plastics material; and wherein the drawn portion comprises at least a majority of the longitudinal extent of two opposed side walls of the passageway, while the pre-formed, undrawn portion provides a transverse abutment part which provides an end wall of the passageway at the end of the passageway distant from the body part of the snood.

2. A fishing tackle according to claim 1 wherein at least one of the side walls of the passageway is formed with a projection upstanding from at least one side wall and adapted to engage a part of the member facing away from the end wall releasably to retain the transverse abutment part adjacent said end wall of the passageway.

3. A fishing tackle according to claim 2 wherein the or each projection is provided in the undrawn portion of the attachment means.

4. A fishing tackle according to claim 1 wherein the passageway has an extent in the longitudinal direction of the body part of the snood which permits entry of the transversely extending part of the member with minimum clearance.

5. A fishing tackle according to claim 1 wherein the snood comprises a monofilament synthetic plastics material or a multifilament synthetic plastics material.

6. A fishing tackle according to claim 1 wherein the snood, at the other end of the body part, is provided with a second attached means similar to said attachment means.

7. A fishing tackle according to claim 1 wherein the snood, at the other end of the body part, is provided with a second attachment means which comprises a wholly pre-formed, undrawn, synthetic plastics material enlarged portion having a passageway therein, said passageway terminating in and extending between open mouths disposed at opposite ends of the passageway so as to be spaced apart transversely to a longitudinal axis of the body part and a member for engagement with the second attachment means having a body part with a transversely extending part having a free end, projecting rigidly from said body part of the member into said passageway of said enlarged portion of said second attachment means through one of said open mouths and abutting a transverse abutment part provided by a wall of the passageway and said member having a retaining means at the free end of the transversely extending part to retain said transversely extending part in the passageway.

8. A fishing tackle according to claim 1 wherein the snood, at the other end of the body part, is provided with a second attachment means which comprises a transversely extending portion at the other end of the snood to the first attachment means, the transversely extending portion having a free end adapted to be received within an opening of a further member such as an eye of a conventional fishing swivel comprising a pair of eyes connected together in rotatable inter-engagement.

9. A fishing tackle according to claim 8 wherein the transversely extending portion of the second attachment means has a further retaining means which projects transversely relative to the longitudinal extent of the transversely extending portion and is adapted to engage the further member to retain the further member in engagement with the transversely extending portion.

10. A fishing tackle comprising an elongate snood having an elongate small diameter body part and at one end of the body part and integral therewith, an attachment means comprising a passageway in which is retained a part of a member whereby the member is attached to the snood, said passageway terminating in, and extending between, open mouths disposed at opposite ends of the passageway so as to be spaced apart transversely to a longitudinal axis of the body part, and said member having a body part having a functional part and a transversely extending part having a free end projecting rigidly from said body part of the member into said passageway of said attachment means and abutting a transverse abutment part providing a wall of the passageway and said member having a retaining means at the free end of the transversely extending part to retain said transversely extending part in the passageway, said body part comprising a drawn synthetic plastics material and wherein a first portion of the attachment means, in which is provided a part of said passageway in which said part of the member is retained, comprises a pre-formed, undrawn, synthetic plastics material portion and a second portion of the attachment means, in which is provided a part of said passageway through which said part of the member may pass to permit assembly of said part of the member with said attachment means, comprises a drawn synthetic plastics material.

11. A fishing tackle according to claim 8 wherein the retaining part is adapted to be passed through said passage so that the transverse abutment part of the attachment means is embraced by the body part, retaining part and transversely extending part of the member.

12. A fishing tackle according to claim 11 wherein the transverse abutment part is provided with a pair of grooves in oppositely transversely facing side walls thereof to receive part of the body part and retaining part therein and thus restrain the member from pivotal movement about a transverse axis relative to the attachment means.

13. A fishing tackle according to claim 10 wherein the member is a hook and the body part of the hook comprises a shank having, at one end, said functional part, which comprises a hook shaped tine, and having, at the other end, said transversely extending part and said retaining part.

14. A fishing tackle according to claim 13 wherein the shank extends longitudinally beyond the tip of the tine by less than the longitudinal extent of the tine.

15. A fishing tackle according to claim 13 wherein the shank extends longitudinally beyond the tip of the tine by a distance approximating to twice the longitudinal extent of the retaining part of the hook.

16. A fishing tackle according to claim 13 wherein adjacent said other end of the shank the hook is of generally U-shape, one limb of the U being integral with the shank of the hook, and the other limb of the U providing said retaining part and being of shorter length than the shank of the hook, terminating at a free end and the base part of the U comprising said transversely extending part of the hook.

17. A fishing tackle according to claim 10 wherein the member is a swivel, and the body part of the swivel comprises a shank having, at one end, said functional part, which comprises a swivel connector to connect the body part rotatably to a further component, and has, at the other end, said transversely extending part and said retaining part.

18. A method of making a fishing tackle comprising the steps of providing a pre-form snood made of synthetic plastics material and having a pre-form attachment means at one end of a pre-form body part, said pre-form attachment means comprising a passageway having two opposed side walls and a transverse abutment part which provides an end wall of the pre-form passageway at the end thereof distant from the body part of the pre-form snood, heating said pre-form body part and a part of said pre-form attachment means, applying a tension force to the pre-form body part and the pre-form attachment means to stretch the pre-form body part and a portion only of the pre-form attachment means to form a drawn portion comprising at least a majority of the longitudinal extend of two opposed side walls of the passageway of the snood, while the pre-formed, undrawn portion comprises said transverse abutment part which provides an end wall of the passageway of the snood at the end of the passageway distant from the body part of the snood.

19. A method according to claim 18 wherein an aperture of the pre-form attachment means has received therein a locating element and the pre-form snood is engaged with a second element at or adjacent the other end of the pre-form body part and the method include the step of causing relative movement between the locating element and the second element to stretch the portion of the pre-form therebetween.

* * * * *